Figure 18:
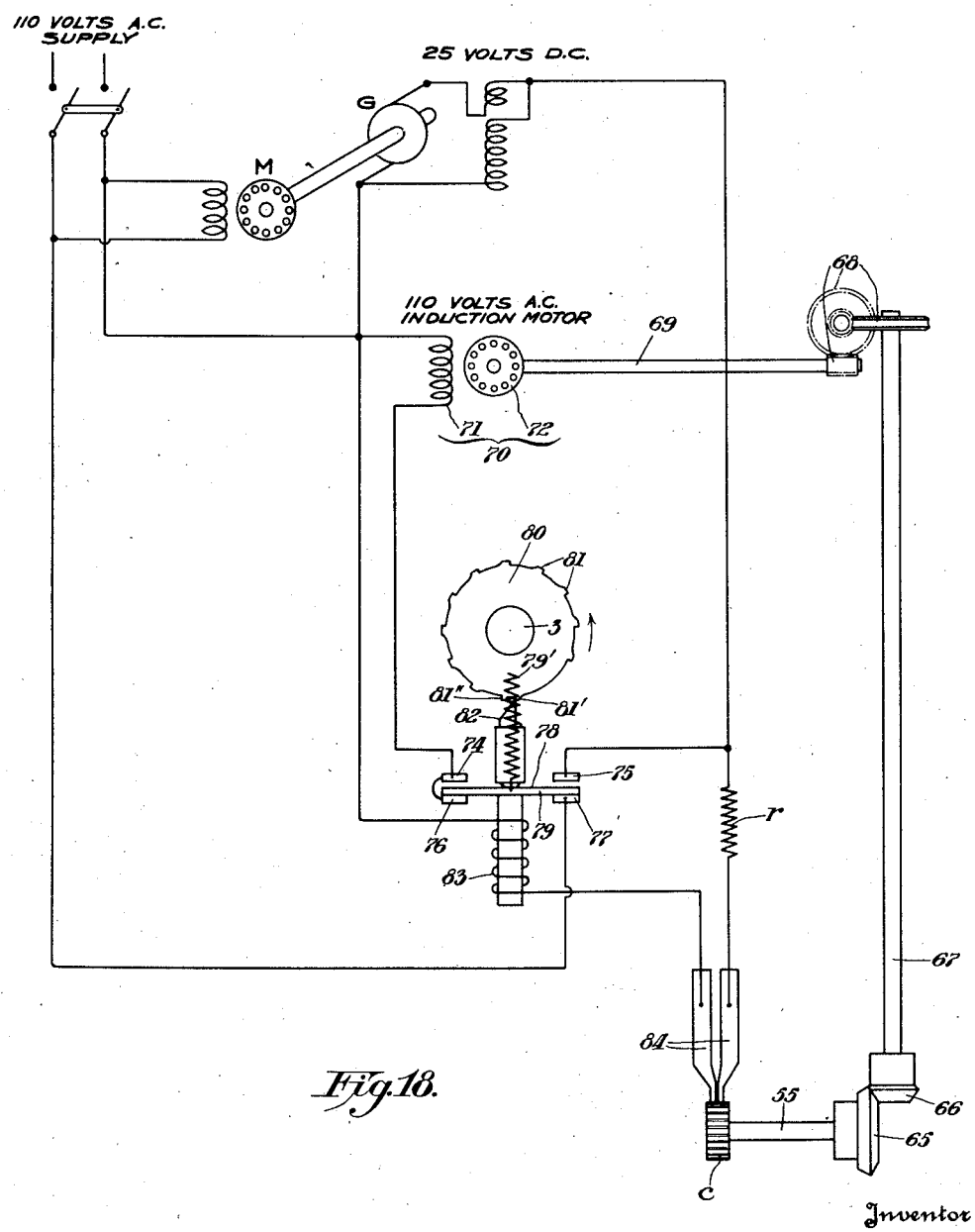

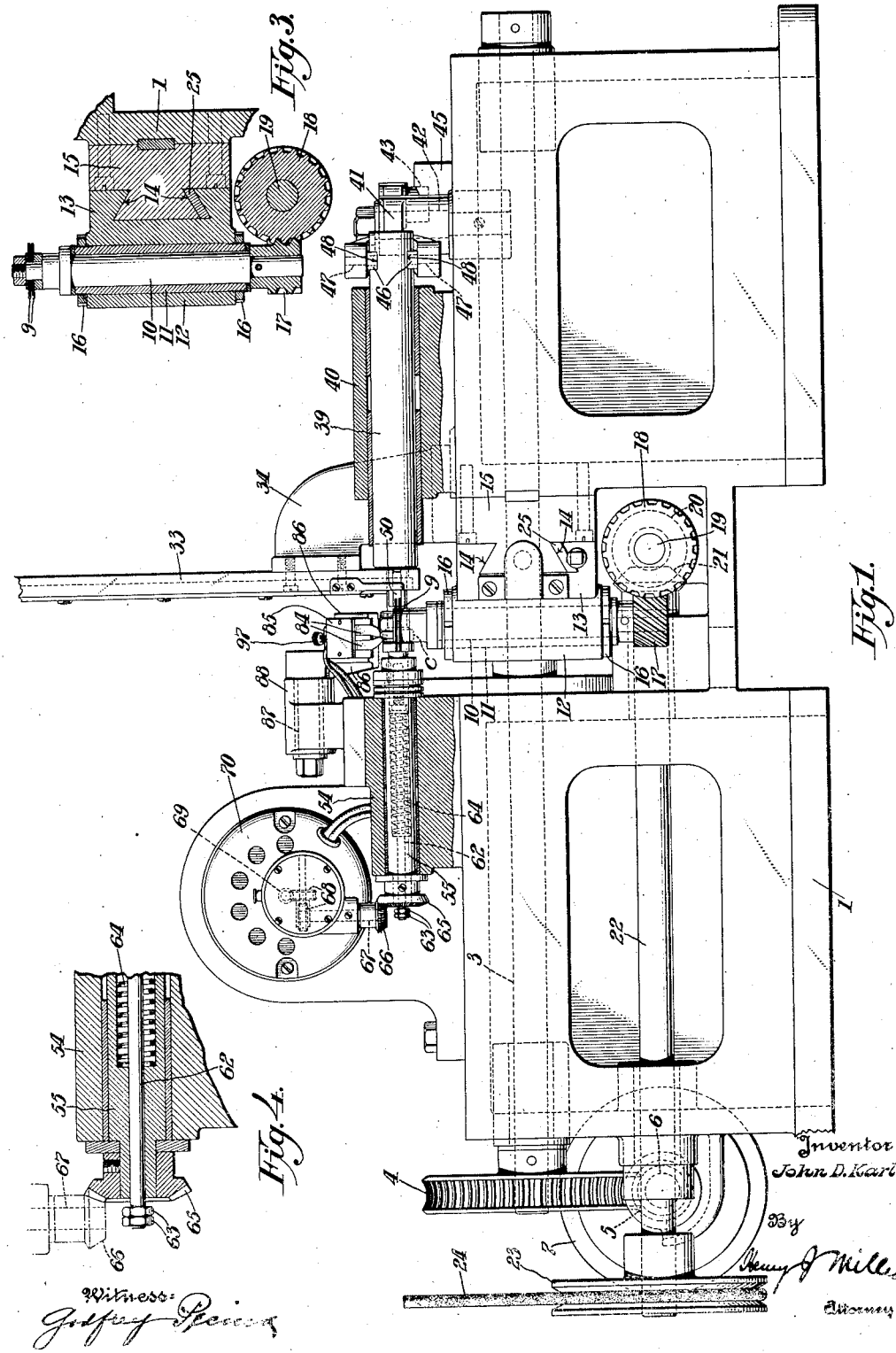

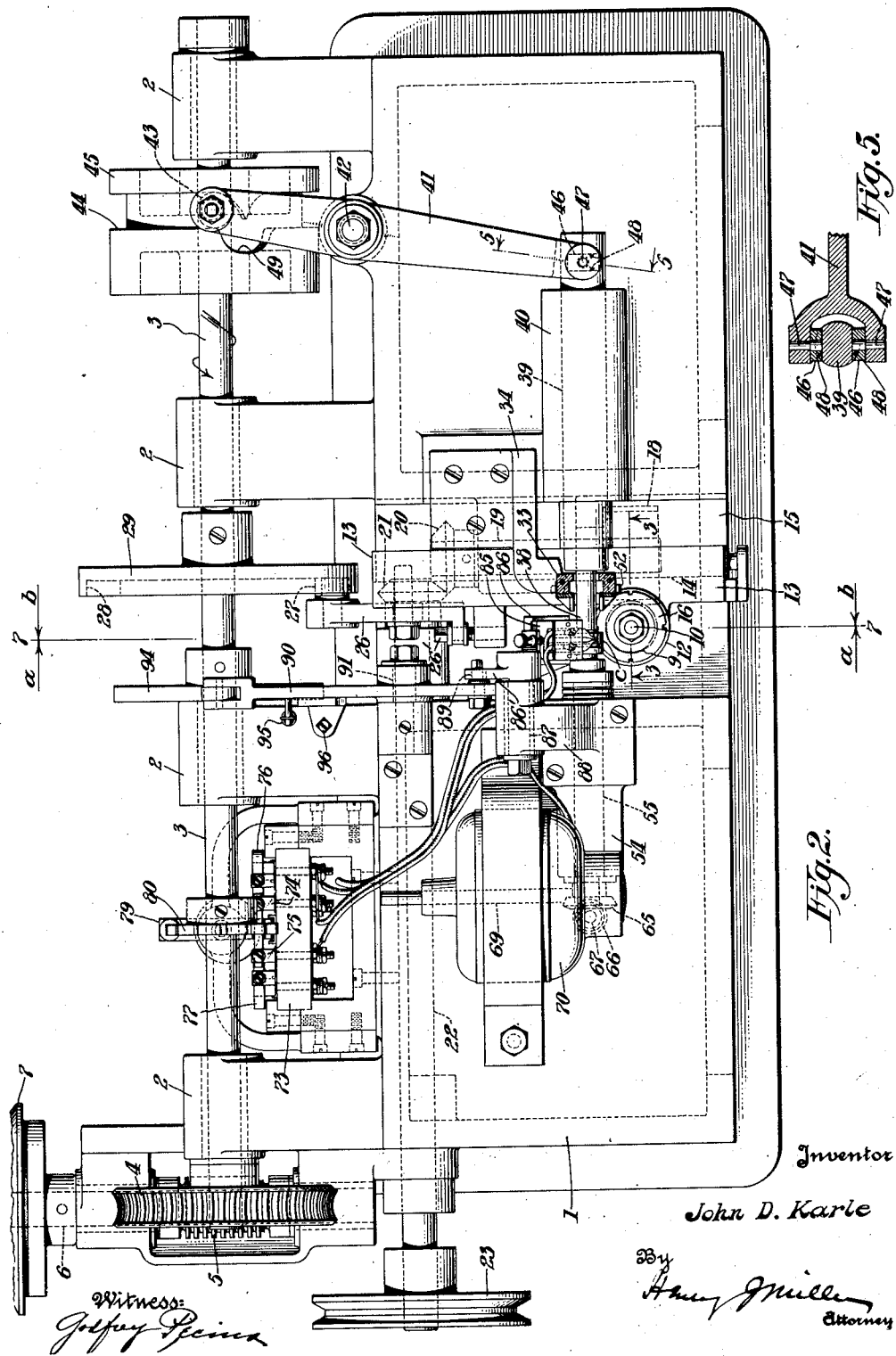

May 30, 1933.  J. D. KARLE  1,911,574
COMMUTATOR SLOTTING MACHINE
Filed March 18, 1931   6 Sheets-Sheet 3
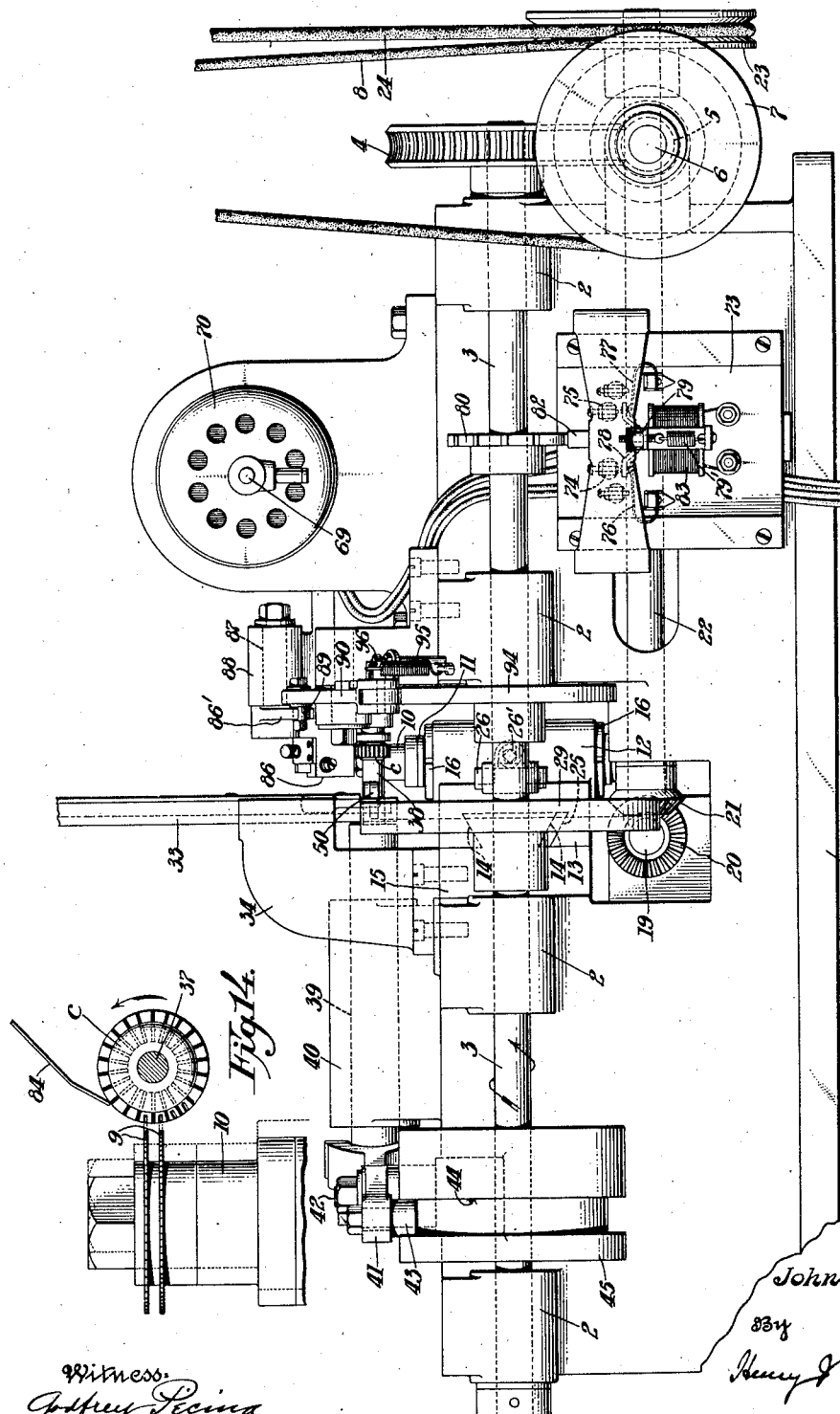

May 30, 1933.  J. D. KARLE  1,911,574
COMMUTATOR SLOTTING MACHINE
Filed March 18, 1931  6 Sheets-Sheet 4
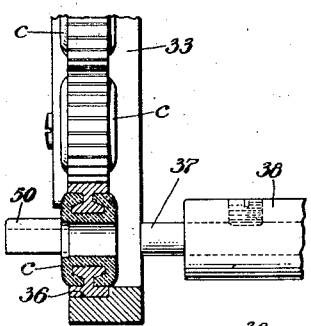
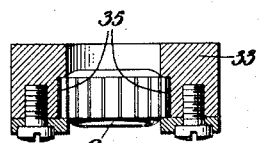
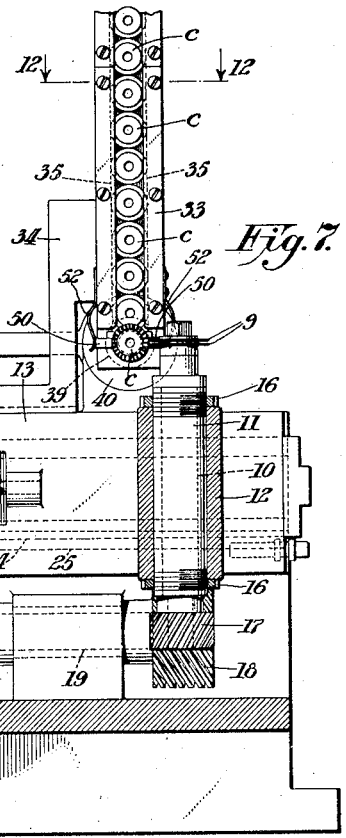
Inventor
John D. Karle
Witness:
By Henry J. Miller
Attorney May 30, 1933.  J. D. KARLE  1,911,574
COMMUTATOR SLOTTING MACHINE
Filed March 18, 1931   6 Sheets-Sheet 5
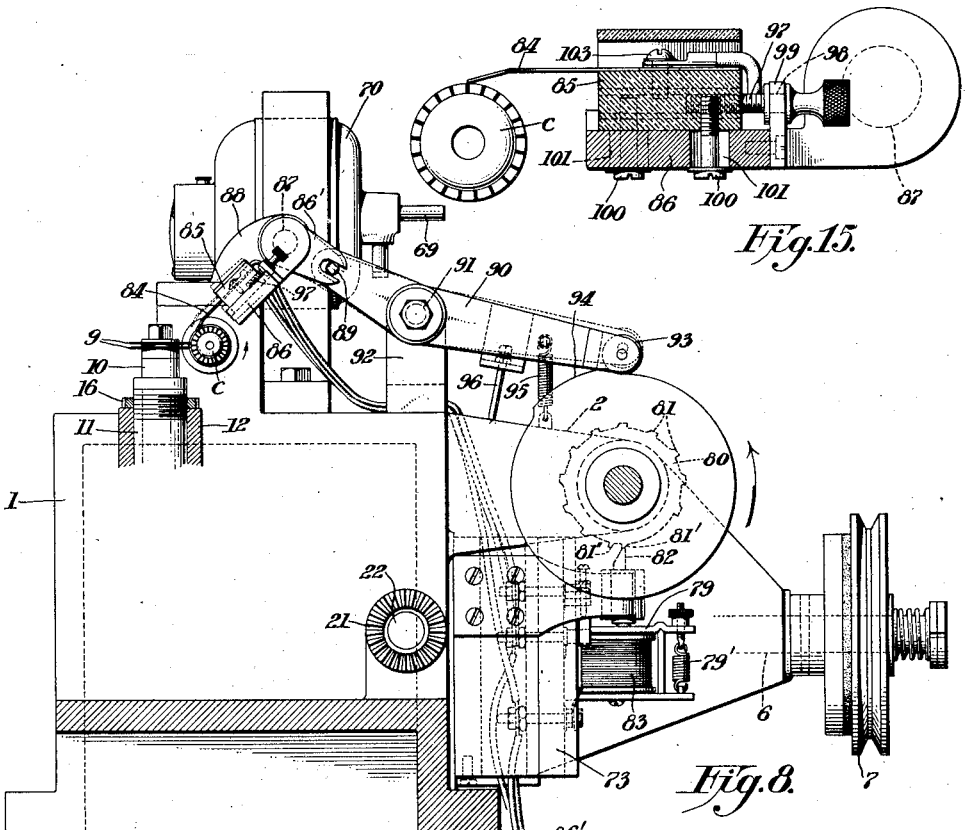
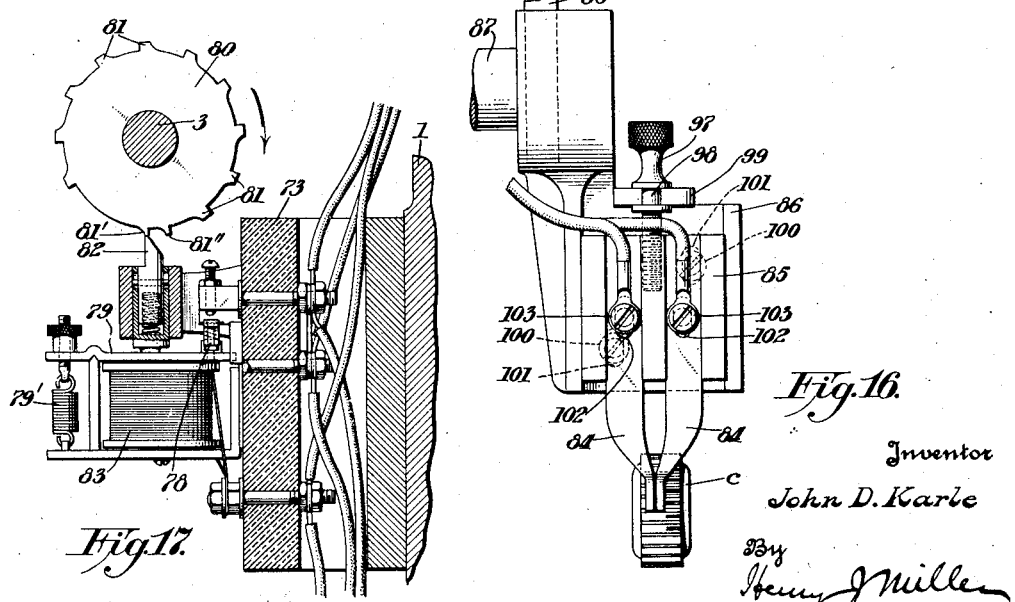
Inventor
John D. Karle
By
Henry J Miller
Attorney Patented May 30, 1933

1,911,574

UNITED STATES PATENT OFFICE

JOHN D. KARLE, OF ROSELLE PARK, NEW JERSEY, ASSIGNOR TO DIEHL MANUFACTURING COMPANY, OF ELIZABETH, NEW JERSEY, A CORPORATION OF NEW JERSEY

COMMUTATOR SLOTTING MACHINE

Application filed March 18, 1931. Serial No. 523,497.

This invention relates to devices for performing machining operations on electrical commutators. A commutator, as usually constructed, is a cylindrical assembly of copper-segments separated by commutator-segment-insulation strips of mica; the segments and strips being held or bound tightly together by suitable clamping rings or by being embedded in a cylindrical mass of molded phenolic condensation material or heat-hardening artificial resin well known in the art. To facilitate the electrical connection to the commutator of the commutator-leads of the armature winding of an electric motor or generator, it is customary to cut wire-receiving slots in the segments of the commutator at one end of the latter, the commutator-leads being inserted and soldered in the slotted ends of such segments.

Heretofore, the operation of slotting the commutator has always been performed by hand; the operator visually guiding the commutator to the slotting saw to place the saw-cuts as nearly centrally of the widths of the respective segments as possible. Due to the small sizes of many types of commutators and the narrow dimensions of the commutator segments, this operation requires the utmost concentration on the part of the operator and is very fatiguing. Furthermore, the positions of the slots in the segments frequently depart so far from the desired approximately central position and are so close to the mica insulation that the commutator cannot be used and must be discarded as defective.

The present invention has for an object to provide a device for automatically performing machining operations on a commutator, and more particularly for slotting the segments of a commutator, which device will relieve the operator of the necessity of visually and manually locating the commutator segments and the cutting tool or slotter in their proper positions relative to one-another. A further object of the invention is to provide a commutator-handling device which will automatically insure a high degree of accuracy in the locations of the cuts relative to the copper-and mica-segments of the commutator, regardless of variations in the widths and spacings of such segments.

The invention comprises the devices, combinations and relative arrangements of parts hereinafter described and claimed.

The features of the invention and the advantages attained thereby will be readily understood by those skilled in the art from the following detailed description of one specific embodiment of the invention which I have chosen as a basis for the present disclosure.

In the accompanying drawings Fig. 1 is a front side elevation, partly in section, of a commutator slotting machine embodying the invention. Fig. 2 is a top plan view of the machine. Fig. 3 is a section on the line 3—3, Fig. 2. Fig. 4 is a fragmentary section on an enlarged scale of the rearward or left-hand end of the commutator indexing spindle shown in Fig. 1. Fig. 5 is a section on the line 5—5, Fig. 2. Fig. 6 is a rear side elevation of the machine. Fig. 7 is a section on the line 7—7, Fig. 2, looking in the direction of the arrows $a$. Fig. 8 is a section on the line 7—7, Fig. 2, looking in the direction of the arrows $b$. Fig. 9 is a horizontal section through the front or commutator-engaging end of the commutator-indexing spindle, showing a commutator in position for the slotting operation. Fig. 10 is a face view and Fig. 11 is an elevation of the commutator engaging end of the indexing spindle. Fig. 12 is a section on the line 12—12, Fig. 7. Fig. 13 is a central vertical sectional view through the lower end of the commutator-supply chute showing the commutator pick-up and supporting element in retracted position. Fig. 14 is a section through the commutator-supporting element, showing the slotter and commutator-segment-insulation detector in their relative working positions. Fig. 15 is a detailed elevation, partly in section, of the commutator-segment-insulation detector. Fig. 16 is a top plan view of such detector. Fig. 17 is a side elevation of the start- and stop-control relay and the start-control cam, and Fig. 18 is a wiring diagram of the electrical devices involved in the illustrated embodiment of the invention.

The bed or frame-casting of the machine is indicated by the numeral 1 and includes the four rearwardly extending arms 2 in which is journaled the controlling cam-shaft 3 having fixed to one of its ends the gear 4 which meshes with the worm 5 on the driving shaft 6 carrying the belt-pulley 7 connected by the belt 8 to a suitable counter-shaft or source of power. The cam-shaft 3 is rotated at a relatively slow speed and makes one complete rotation for each complete commutator-slotting cycle of operations; that is, a completely slotted commutator is discharged from the machine for each rotation of the cam-shaft 3.

The commutator slotter comprises, in the present instance, a pair of spaced circular slot-cutters or saws 9 mounted on the upper end of the vertical saw-spindle 10 which is journaled in the bushing 11 slidably received in the vertically apertured boss 12 of the cross-head 13 mounted to slide transversely of the bed 1 on ways 14, Fig. 1, formed on the block 15 screwed to the bed 1. The bushing 11 is threaded at its opposite ends to receive the nuts 16 which engage the upper and lower end-faces of the boss 12 and permit of the vertical adjustment of the working positions of the saws 9. The spindle 10 has fixed to its lower end the spiral gear 17 which meshes with the companion gear 18 fixed on the cross-shaft 19 journaled in the bed 1. The cross-shaft 19 also has fixed to it a bevel gear 20 which meshes with the companion gear 21 on the slotter-driving shaft 22 journaled in the bed 1 and carrying the belt-pulley 23 which is connected by the belt 24 to a counter-shaft or other suitable source of power. The cross-head 13 includes the bearing gib 25 which is slightly tapered and may be adjusted longitudinally to take up any wear between the cross-head 13 and the slide-ways 14.

Mounted on and adjustable longitudinally of the cross-head 13 is an arm 26 carrying a cam-follower roll 27 entering the cam-slot 28 in the slotter-advancing and -retracting cam 29 on the cam-shaft 3. The cam-slot 28 has a series of slotter-advancing and -retracting wavy portions 30, Fig. 7, with intermediate concentric dwell-producing portions 31 for holding the slotter away from the commutator during the turning or indexing movements of the latter. The cam-slot 28 also has a relatively long dwell-producing portion 32 which holds the slotter in retracted position during the discharge of a slotted commutator and the pick-up of an un-slotted commutator by the work-holding and indexing mechanism to be described. The spiral gear 18 is long enough to permit the gear 17 to move with the cross-head 13 and remain in proper mesh with the gear 18. Adjustment of the arm 26 on the cross-head 13 may be effected by turning the adjusting screw 26'. This adjustment regulates the depth of the saw-cuts.

The commutators c, Figs. 7, 9, 12 and 13, are supplied to a vertical magazine or chute 33 which is supported by the bracket-arm 34 rising from the bed 1. The chute 33 is formed with the commutator guide-ways 35, Fig. 12, and has a bottom end-wall 36 for supporting the commutator-stack with the lowermost commutator in axial alinement with the reciprocating commutator pick-up and supporting arbor 37. The arbor 37 is supported by the reduced end 38 of the slide-shaft 39 working in the boss 40 on the bed 1.

The slide-shaft 39 is reciprocated by means of a lever 41 fulcrumed at 42 on the bed 1 and having a follower roll 43 entering the cam-groove 44 in the commutator pick-up and discharge cam 45 on the cam-shaft 3. The front end of the lever 41 is forked, as shown in Fig. 5, and carries a pair of blocks 46 on the alined pivots 47; the blocks 46 working in ways 48 cut transversely in the slide-shaft 39. The cam 44 has a long dwell-producing portion for holding the arbor 37 in advanced or commutator-supporting and -indexing position, Fig. 9, followed by a short curved or humped portion 49, Fig. 2, for giving a relatively rapid retraction of the arbor, to the position shown in Fig. 12, to shed the slotted commutator, followed immediately by the advance or return of the arbor to the position shown in Fig. 9.

It will be understood that when the arbor 37 is retracted, the finished commutator c, Fig. 9, engages the ends of the push-off fingers 50 and is stopped by such fingers while the arbor 37 in its continued retracting movement is pulled out of the commutator which drops into a suitable receptacle (not shown). The fingers 50 are pivotally mounted at 51 at the lower end of the chute 33 and are urged by springs 52 to their contracted or push-off positions, Fig. 9. These fingers are formed with inclined shoulders 53 which engage the lowermost commutator in the chute 33 and hold such commutator in the chute until it is entered and picked up by the advancing arbor 37, whereupon the fingers 50 are expanded or pushed apart as the arbor carries the picked-up commutator to indexing position, Fig. 9. The fit of the arbor 37 in the axial aperture in the commutator is a free turning fit.

Journaled in the bearing boss 54, in axial alinement with the arbor 37 and slide-shaft 39, is the commutator-indexing shaft 55 having a shoulder 56, Fig. 1, engaging the ball-thrust-bearing 57. The shaft 55 is hollow and has slidably fitted therein the shank 58 of the commutator-engaging head 59 having on its face the radially disposed commutator-engaging and -driving teeth 60. The shank 58 of the head 59 is keyed at 61 to be rotated with the shaft 55 but is free to slide axially of such shaft. Screwed into the inner end of the shank 58 is the rod 62 which passes through the other end of the shaft 55 and carries the stop-nuts 63. A compression spring 64 surrounds the rod 62 within the shaft 55 and yieldingly urges the commutator-engaging and -indexing head 59 into driving engagement with the commutator c on the arbor 37, Fig. 9.

The shaft 55 has fixed to its end opposite the head 59 a bevel gear 65 which is driven by the pinion 66 on the vertical shaft 67 connected by a double-reduction worm-and-gear device 68 to the rotor-shaft 69 of an ordinary self-starting single-phase induction motor 70 having an exciting or field winding 71, Fig. 18, and a short-circuited secondary winding on the rotor 72. It will be understood that the motor 70, when running, will turn or index the commutator on the arbor 37. When the motor is stopped, the indexing movement of the commutator is terminated.

According to the specific embodiment of the invention illustrated, the machine is designed to slot the segments of a twenty-two bar commutator in eleven advances of the slotter alternating with eleven indexing movements of the commutator. Two slotting saws 9 are used and these saws are spaced apart a distance approximately equal to the circumferential pitch of the center lines of the commutator-segments. While the saw cuts made in accordance with this arrangement are not truly radial, they are satisfactory for the purpose of receiving the armature wires to be soldered therein, and the production of the machine is double that of a machine which slots but one bar at a time.

To control the starting and stopping of the commutator-indexing motor 70, the following means are provided: Mounted at the rear of the machine, below the cam-shaft 3 is a relay indicated generally by the numeral 73. This relay is the equivalent of a single-pole double-throw switch and has two upper contacts 74, 75 and two lower contacts 76, 77. Working between the upper and lower contacts is a bridging contact 78 which is carried by the pivoted armature 79 of the relay.

Referring to Fig. 18, one leg of the 110 volt alternating current supply circuit is connected to the lower relay-contact 77 which, in the down-position of the relay-armature 79, is connected to the lower contact 76; the latter being connected to the upper contact 74 and to one end of the exciting field coil 71 of the induction-motor 70.

The other end of the exciting coil 71 is connected to the other leg of the alternating-current supply circuit. Hence, when the relay-armature 79 is moved to its down-position, the motor 70 will be started and will turn or index the commutator c.

For abruptly stopping the motor, without shock, there is provided a direct-current supply at a pressure of about 25 volts. The direct-current supply may be readily obtained from a motor-generator set M—G. One leg of the direct-current supply is connected to the upper end of the exciting coil 71 of the induction-motor 70. The other leg of the direct-current supply is connected to the upper relay-contact 75. Hence, when the relay-armature 79 is raised to its upper position by the action of the relay-spring 79', the exciting field 71 of the motor 70 is instantly switched from the alternating- to the direct-current supply which causes a powerful electro-magnetic braking effort to be applied to the rotor 72, stopping such rotor and the connected commutator c instantly and without appreciable overthrow.

Mounted on the cam-shaft 3 is a start-control cam 80 having ten starting teeth 81 of uniform width circumferentially of the cam, an initial starting tooth 81' and a second starting tooth 81" the purpose of which will be hereinafter explained. The teeth 81', 81" and 81 are adapted to successively depress a plunger 82 which, in turn, depresses the relay-armature 79 to motor-starting position.

The relay 73 includes a holding coil 83 which is connected to the direct-current supply in series with a suitable resistance r and a pair of commutator-segment-insulation detector-contacts or brushes 84. The contacts 84 are in the form of a pair of resilient blades which are mounted on the insulating head 85 carried by and adjustable longitudinally of the brush-holder-arm 86 carried by the rock-shaft 87 journaled in the bracket 88 rising from the bed 1. The arm 86 has a rearward extension 86' which is forked to embrace a stud-pin 89, Fig. 8, on a lever 90 fulcrumed at 91 on the frame-bracket 92 and carrying a cam-roll 93 in position to be engaged by the detector-elevating cam 94 on the cam-shaft 3.

During the slotting and indexing of a commutator, the tip ends of the detector-contacts 84 rest lightly upon the cylindrical surface of the commutator. The lever 90 is urged by a spring 95, Fig. 8, in a direction to press the contacts 84 upon the commutator. An adjustable stop-pin 96 is carried by the lever 90 and engages one of the frame-arms 2 to positively limit the position to which the lever 90 is moved by the spring 95. When one of the copper bars of the commutator is engaged by the detector-contacts 84, the direct-current circuit through the holding coil 83 is closed and such coil holds the relay-armature 79 in its depressed position after the particular starting tooth 81 of the starting cam 80 has passed the plunger 82. The resistance $r$ is of such a value that the coil 83 will be strong enough to hold the relay-armature 79 in depressed position against the restoring force of the spring 79' but will not be strong enough to pull the armature down from its upper position.

Each of the ten teeth 81 of the start-control cam 80 is wide enough circumferentially of the cam 80 to hold the relay-armature 79 in depressed position for a period of time about equal to the time required by the induction motor 70 to index the commutator the angular amount of one copper-segment plus one mica-segment plus one-half of the next copper-segment. The active tooth 81 then passes the plunger 82 while the contacts 84 are bearing approximately centrally of the second copper-segment, and the coil 83 holds the relay-armature 79 in running position until the second mica-segment passes under one or both of the detector-contacts 84 and breaks the circuit through the holding coil 83, thus releasing the relay-armature 79 which is drawn instantly to its upper position by the spring 79' and stops the commutator by switching the exciting field of the motor 70 to the direct-current supply.

It will be understood that the commutator to be slotted may be picked-up by the arbor 37 and presented to the indexing head 59 and detector-contacts 84 with the mica- and copper-segments in any position relative to the contacts 84. The contacts 84 may initially rest upon a copper-segment or upon a mica-segment. It may occasionally happen that at the instant the first tooth of the start-control cam 80 releases the plunger 82, the brushes 84 will be bearing upon a mica-segment somewhere between the leading and trailing edge of such mica-segment. In this event, the coil 83 will not be energized to hold the relay-armature 79 down when the first starting tooth releases it and consequently it will immediately rise and stop the indexing movement of the commutator at an indeterminate point within the limits of the circumferential width of the mica-segment. If the slotter were operated after the initial commutator-starting and -stopping operation, it would occasionally happen that the first saw-cut would be in error by an amount possibly as great as the circumferential width of one mica-segment. To overcome this possibility of error, the first tooth 81' is provided to initially start the commutator and allow it to be stopped with the possibility of the error just described, the slotter being held in retracted position. The second tooth 81" then depresses the relay-armature 79 and is circumferentially long enough to hold it depressed for a period about equal to the time required for the motor 70 to index the commutator an angular distance of one-half the circumferential width of a copper-segment. Hence, when the second tooth 81" releases the relay-armature 79, the detector-brushes 84 will invariably be in engagement with a copper-segment and the circuit through the relay holding-coil 83 will be closed and will hold the relay-armature 79 down until the next mica-segment engages one of the brushes 84 and breaks the relay-release circuit to stop the commutator in a correctly indexed position relative to the slotter 9; the latter being thereupon advanced to the commutator for the first cut. The further indexing and slotting operations then proceed in alternation until all of the copper-segments are slotted.

A fine adjustment is provided for relatively adjusting the detector-contacts 84 and the slotting saws 9 circumferentially of the commutator, so that the saws 9 will make their cuts centrally of the copper-segments. To this end there is threaded into the insulating block 85, which supports the contacts 84, an adjusting screw 97 having a grooved collar 98 anchored in the slotted arm 99 fixed to the holder-arm 86. There are also threaded into the insulating block 85 a pair of holding screws 100 which pass through slots 101 in the arm 86 and serve to tightly hold the block 85 in adjusted position. It will be further observed that the detector-contacts 84 are individually adjustably mounted on the insulating block 85 by being formed with slots 102, Fig. 16, through which pass the shanks of the binding screws 103. While it is preferable to set the detector-contacts 84 even with one-another and grind their ends square so that a corner contact is obtained between the contact ends and the commutator surface, it may under some conditions be advantageous to set one of the contacts slightly in advance of the other.

The operation of the machine may be briefly summarized, as follows:

When the commutator being operated upon is completed, the cam 94 lifts the detector-contacts 84 from the commutator and the cam-portion 49 of the cam 45 imparts a single retracting and advancing movement to the slide-shaft 39 to shed the completed commutator and pick-up a fresh commutator from the bottom of the commutator-stack in the chute 33; carrying such fresh commutator into engagement with the teeth 60 of the yielding driving head 59. As soon as the engagement of the commutator with the driving head 59 is effected, the cam 94 lowers the detector-contacts 84 upon the commutator and the first tooth 81' of the start-control cam 80 depresses the relay-armature 79 to start the commutator indexing operation. When the first starting tooth 81' releases the relay-armature 79, the latter may rise immediately, if one or both of the detector-contacts happen to be bearing upon a mica-segment, or it may be held down by the relay-holding coil 83 until the commutator is indexed far enough to carry a mica-segment under one of the contacts 84, whereupon the commutator will be stopped. The second start-control tooth 81'' again depresses the relay-armature 79 to start the commutator and invariably releases the relay-armature when the contacts 84 are in engagement with the following copper-segment, so that the relay-armature will be held down until the next mica-segment is carried under one of the contacts 84, whereupon the commutator will invariably be stopped in a correctly indexed position.

The cam 29 now advances the slotter 9 for the first cut upon the commutator and immediately retracts such slotter. A tooth 81 of the start-control cam 80 next depresses the relay-armature 79 to start the indexing movement of the commutator; the teeth 80 being circumferentially long enough to hold the relay-armature down until the commutator has been indexed approximately one and one-half copper-segments. The relay-armature is electrically released by the passage of the following or second mica-segment under the detector 84 and the slotter is again advanced and retracted. The indexing and slotting operations continue, in alternation, until the commutator is completely slotted.

Having thus set forth the nature of the invention, what I claim herein is:—

1. A commutator slotting machine having, in combination, means for supporting and indexing the commutator about its axis, a commutator slotter, and means for stopping the commutator with one or more of its bars in predetermined slotting position relative to said slotter, said last mentioned means including a starting and stopping relay and a relay-control circuit, said circuit including a circuit making and breaking contact element bearing upon the commutator.

2. A commutator slotting machine having, in combination, means for supporting the commutator for indexing movement about its axis, a commutator slotter, and means for indexing and stopping the commutator, said last mentioned means including a starting and stopping relay having a stop-control coil, and contact-means bearing upon the commutator and in circuit with said stop-control coil, said coil being de-energized to stop the commutator by the breaking of the circuit through the stop-control coil by the passage of a commutator-segment-insulation strip under an element of said contact-means.

3. A commutator slotting machine having, in combination, means for supporting the commutator for indexing movement about its axis, a commutator slotter, and means for indexing and stopping the commutator, said last mentioned means including a starting and stopping relay having a stop-control coil and contact-means bearing upon the commutator and in circuit with said stop-control coil, said coil being de-energized to stop the commutator by the breaking of the circuit through the stop-control coil by the passage of a commutator-segment-insulation strip under an element of said contact-means, and means independent of said contact-means for shifting said relay to starting position.

4. A commutator slotting machine having, in combination, means for supporting and indexing a commutator, a commutator slotter, and means for stopping the commutator with one of its bars in predetermined slotting position relative to said slotter, said last mentioned means including an electric control circuit and a contact element bearing upon the commutator and operative as a commutator-segment-insulation detector, and means for relatively adjusting said contact element and commutator-slotter circumferentially of the commutator to locate the slots in the desired positions relative to the commutator-segments.

5. A commutator slotting machine having, in combination, means for indexing the commutator including a self-starting induction motor and a system of reduction gearing, said motor having an exciting field-coil and a short-circuited rotor circuit, an alternating-current supply circuit for running said induction motor, a commutator slotter, a direct-current supply circuit, a no-current-responsive relay for switching the exciting field-coil of the motor from the alternating-current supply to the direct-current supply to stop the motor, and a relay-control circuit including a pair of brushes bearing upon the commutator and operative to break the relay-control circuit in predetermined positions of the commutator.

6. A commutator slotting machine having, a commutator holder, a commutator slotter, and means for indexing the commutator, said means including a stopping-position-controlling detector bearing upon the commutator, a cam-shaft, and a cam on said shaft for shifting said detector out of and into operative position between complete commutator-slotting operations.

7. A commutator slotting machine having, in combination, a commutator holder, a commutator slotter, means for indexing the commutator, means for advancing the slotter to the commutator between indexing operations, a control cam-shaft, a cam on said shaft and connections for effecting the feeding of a commutator to slotting position and its discharge therefrom, a second cam on said shaft and connections for controlling the advance and recession of the slotter, a third cam on said shaft and connections for initiating the indexing movements of the commutator following each recession of the slotter, and electrical means for stopping each indexing movement, said last-mentioned means including a commutator-segment-insulation detector contact bearing upon the commutator, and a stop-control relay in circuit with a commutator segment and said contact.

8. A commutator slotting machine having a commutator holder, a commutator slotter, means for periodically advancing said slotter to the commutator and retracting it from the latter, and means for indexing the commutator following each retraction of the slotter, said last-mentioned means including driving and stopping means and an electric control circuit including a commutator-segment-insulation detector contact bearing upon the commutator and controlling the time of action of said stopping means by opening said circuit.

9. In a commutator slotting machine, the combination with means for supporting and indexing a commutator, and a commutator slotter, of a commutator-segment-insulation detector-holder pivoted on an axis parallel to the commutator-axis, and a commutator-segment-insulation detector carried by said holder and adjustable transversely of said axes, said detector being adapted to bear upon the commutator and control the stopping of the indexing movement of the commutator.

10. In a commutator handling machine, means for supporting and indexing a commutator, means for controlling the indexing movement including a pair of commutator-segment-insulator detector-contacts, a support on which said detector-contacts are adjustable relatively to one-another, and means for adjusting said support relative to the commutator supporting and indexing means.

11. A commutator slotting machine having, in combination, a commutator supply chute, a reciprocating shaft passing transversely of and through said chute, a commutator indexing shaft, a commutator slotter movable transversely of the axis of said reciprocating shaft, means for periodically advancing and retracting said slotter, means for driving said indexing shaft while said slotter is retracted, and means for stopping said shaft including a control-circuit and a circuit-maker and -breaker influenced by the commutator being operated upon.

12. In a commutator slotting machine, a detector element bearing upon the commutator, a cam-shaft, a cam on said shaft and connections for moving said detector element away from the commutator, a spring for moving said detector element toward the commutator, and a positive stop independent of said cam and shaft for determining the limit of movement imparted to said detector element by said spring.

13. In a commutator handling machine, a commutator magazine, a reciprocating commutator pick-up arbor, means for projecting said arbor through and beyond said magazine, pivotally yielding means for detaining the commutator in said magazine until it is entered by said arbor in the advance movement of the latter, said pivotally yielding means being constructed and arranged to strip the commutator from the arbor in the return movement of the latter.

14. A commutator slotting machine having, in combination, a commutator driver, a commutator slotter, a stop-timing electrical contact adapted to bear upon the commutator, and means electrically controlled by said stop-timing contact for governing the stopping of the commutator driver.

15. A commutator slotting machine having, in combination, a commutator driver, a commutator slotter, a stop-timing electrical contact adapted to bear upon the commutator, means electrically controlled by said stop-timing contact for governing the stopping of the commutator driver, and means for relatively adjusting said slotter and stop-timing contact circumferentially of the commutator.

16. In a commutator slotting machine, a commutator slotter, a rotary commutator driver, means for actuating said driver, a rotatable power-shaft, cam-controlled means actuated by said power-shaft for governing the starting of the rotation of said driver, and commutator controlled means for governing the stopping of the rotation of said driver.

17. In a commutator slotting machine, a slotter, a rotatable commutator driver, means for rotating said driver, commutator controlled means for stopping the rotation of said driver, and means independent of said commutator controlled means for starting the rotation of said driver.

18. A commutator slotting machine having, a commutator holding element and a commutator slotting element mounted for relative indexing movement axially of the commutator, means for causing such relative movement, a stop-timing electrical contact adapted to bear upon the commutator, and means electrically connected to said stop-timing contact for stopping such relative movement in a predetermined position.

19. In a commutator making machine, a machining tool, means for driving said tool, a commutator containing magazine, intermittently acting commutator rotating means spaced from said magazine, means for transferring a commutator from said magazine to said commutator rotating means, an electrical contact element adapted to engage the commutator after the latter has been transferred to said commutator rotating means, means electrically connected to said contact element for arresting the rotary movements periodically imparted to the commutator by the commutator rotating means and means for causing said machining tool to engage the commutator during the periods of arrested rotary motion of the latter.

20. In a commutator slotting machine, alined commutator driving and commutator supporting shafts, means for rotating said commutator driving shaft, means for reciprocating said commutator supporting shaft, a commutator magazine through which said commutator supporting shaft is reciprocated, a commutator engaging head slidably keyed to said commutator rotating shaft, and a spring engaging said head and urging the latter in a direction toward said commutator supporting shaft.

In testimony whereof I have signed my name to this specification.

JOHN D. KARLE.